US007058493B2

(12) United States Patent
Inagaki

(10) Patent No.: US 7,058,493 B2
(45) Date of Patent: Jun. 6, 2006

(54) VEHICULAR MOTION CONTROL APPARATUS AND VEHICULAR MOTION CONTROL METHOD

(75) Inventor: Shoji Inagaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 205 days.

(21) Appl. No.: 10/691,670

(22) Filed: Oct. 24, 2003

(65) Prior Publication Data
US 2004/0093140 A1 May 13, 2004

(30) Foreign Application Priority Data
Oct. 29, 2002 (JP) ............... 2002-313696

(51) Int. Cl.
G06F 7/00 (2006.01)
G06F 17/00 (2006.01)
G06F 19/00 (2006.01)

(52) U.S. Cl. ......................... 701/41; 701/42
(58) Field of Classification Search ............ 701/41, 701/36
See application file for complete search history.

(56) References Cited

U.S. PATENT DOCUMENTS

| 4,669,745 A * | 6/1987 | Miki et al. ............... 180/410 |
| 4,720,790 A * | 1/1988 | Miki et al. ............... 701/41 |
| 4,926,955 A * | 5/1990 | Ohmura et al. ........... 180/414 |
| 4,951,207 A * | 8/1990 | Furukawa et al. ........ 701/42 |
| 5,271,474 A * | 12/1993 | Nishimoto et al. ........ 180/446 |
| 5,276,624 A * | 1/1994 | Ito et al. .................... 701/72 |
| 5,502,639 A * | 3/1996 | Fukunaga et al. ......... 701/41 |
| 5,589,815 A * | 12/1996 | Nishihara et al. ......... 340/444 |
| 5,863,105 A * | 1/1999 | Sano ......................... 303/146 |
| 5,973,463 A * | 10/1999 | Okuda et al. .............. 318/430 |
| 6,053,583 A * | 4/2000 | Izumi et al. ............... 303/150 |
| 6,276,766 B1 * | 8/2001 | Yamada ..................... 303/154 |
| 6,659,570 B1 * | 12/2003 | Nakamura ................. 303/146 |
| 6,708,088 B1 * | 3/2004 | Matsuno et al. ........... 701/1 |
| 2002/0133278 A1 | 9/2002 | Leaphart |

FOREIGN PATENT DOCUMENTS

EP          0 799 755 A2   10/1997
JP          A 10-287262    10/1998

* cited by examiner

Primary Examiner—Cuong Nguyen
(74) Attorney, Agent, or Firm—Oliff & Berridge, PLC

(57) ABSTRACT

A vehicular motion control apparatus uses a steering angle detected by a steering angle sensor capable of detecting an absolute rotational angle. This control apparatus has a yaw rate sensor. If a reference rotational position of the steering angle sensor has not been determined, the control apparatus calculates a plurality of target yaw rates on the basis of a plurality of steering angles estimated from a steering angle detected by the steering angle sensor, and controls motion of a vehicle on the basis of the minimum one of differences between the target yaw rates and an actual yaw rate. The control apparatus determines a reference rotational position of the steering angle sensor on the basis of a steering angle corresponding to the minimum one of the differences, and then calculates a steering angle for motion control on the basis of the detected steering angle and the determined reference rotational position.

14 Claims, 6 Drawing Sheets

VEHICULAR MOTION CONTROL APPARATUS AND VEHICULAR MOTION CONTROL METHOD

INCORPORATION BY REFERENCE

The disclosure of Japanese Patent Application No. 2002-313696 filed on Oct. 29, 2002, including the specification, drawings, and abstract is incorporated herein by reference in its entirety.

BACKGROUND OF THE INVENTION

1. Field of the Invention

The invention relates to a vehicular motion control apparatus and a vehicular motion control mode. More specifically, the invention relates to a vehicular motion control apparatus and a vehicular motion control method for controlling motion of a vehicle using a steering angle detected by a steering angle sensor.

2. Description of the Related Art

According to a vehicular motion control apparatus for an automobile or the like as a known example, a target behavior of a vehicle is calculated at least on the basis of a detected value of a steeling angle relative to a neutral position of a steering wheel, and motion of the vehicle is controlled in accordance with a difference between a target value of the behavior of the vehicle and an actually measured value of the behavior of the vehicle. In this apparatus, If the neutral position of the steering wheel has not been detected, a steering angle is estimated from a steering angle stored during the last off-period of an ignition switch and a cumulative value of the number of pulses delivered from a steering angle sensor after the turning of the ignition switch, so as to control motion of the vehicle. This vehicular motion control apparatus is disclosed, for example, in Japanese Patent Application Laid-Open No. 10-287262.

In the aforementioned vehicular motion control apparatus, however, a means for storing a steering angle during the last off-period of the ignition switch is required. Also, if a driver operates the steering wheel to cause a change in steering angle before the ignition switch is turned on and aft the ignition switch has been turned off, it is impossible to precisely detect a steering angle. This causes a problem in that motion of the vehicle cannot be controlled suitably.

There is also known a method of detecting on the basis of a yaw rate or the like of a vehicle that the vehicle is traveling straight on at a constant speed, and calibrating a neutral point of a steering angle sensor when the vehicle is traveling straight on at a constant speed. In the case of this method, however, there is a problem in that the neutral point of the steering angle sensor cannot be calibrated unless it is detected that the vehicle is traveling straight on at a constant speed.

SUMMARY OF THE INVENTION

The invention has been made in consideration of the aforementioned problems in a vehicular motion control apparatus that controls motion of a vehicle using a steering angle detected by a steering angle sensor. It is a main object of the invention to precisely detect a steering angle by means of a steering angle sensor and to suitably control motion of a vehicle without requiring any means for storing a steering angle even when an ignition switch is off and even unless the vehicle is traveling straight on at a constant speed, by estimating a plurality of steering angles from a steering angle detected by the steering angle sensor and focusing attention on the magnitudes of differences between an actual vehicle state quantity and a plurality of target vehicle state quantities calculated on the basis of the steering angles.

In order to solve the problems stated above, a vehicular motion control apparatus in accordance with a first aspect of the invention has a steering operator operated by a driver, a steering angle sensor capable of detecting an absolute rotational angle of the steering operator, and an actual vehicle state quantity detector. If a reference rotational position of the steering angle sensor has not been determined, the control apparatus calculates a plurality of target vehicle state quantities on the basis of a plurality of steering angles estimated from a steering angle detected by the steering angle sensor, and controls motion of the vehicle on the basis of the minimum one of differences between an actual vehicle state quantity and the target vehicle state quantities.

A vehicular motion control apparatus in accordance with a second aspect of the invention has a steering operator operated by a driver, a steering angle sensor capable of detecting an absolute angle of the steering operator, and an actual vehicle state quantity detector. The control apparatus calculates a plurality of target vehicle state quantities on the basis of a plurality of steering angles estimated from a steering angle detected by the steering angle sensor, determines a reference rotational position of the steering angle sensor on the basis of a string angle corresponding to the minimum one of differences between an actual vehicle state quantity and the target vehicle state quantities, and then calculates a steering angle for controlling motion of the vehicle on the basis of the steering angle detected by the steering angle sensor and the determined reference rotational position.

In the apparatus of the second aspect, it is also appropriate that time averages of differences between an actual vehicle state quantity and the target vehicle state quantities be calculated, and that a reference rotational position of the steering angle sensor be determined on the basis of a steering angle corresponding to the minimum one of the time averages.

In general the lock-to-lock number of revolutions of a steering operator such as a steering wheel is larger than 1. Therefore, if a reference rotational position of the steering angle sensor has not been determined, a true steering angle cannot be specified on the basis of a steering angle detected by the steering angle sensor. However, a plurality of steering angles axe estimated as possibly true steering angles. One of the steering angles thus estimated is equal to a true steering angle.

Thus, if a plurality of target vehicle state quantities are calculated on the basis of a plurality of estimated steering angles and differences between an actual vehicle state quantity and target vehicle state quantities are calculated, the difference between the actual vehicle state quantity and the target vehicle state quantity calculated on the basis of the estimated steering angle equal to a true steering angle is smaller than the differences between the actual vehicle state quantity and the target vehicle state quantities calculated on the basis of the other estimated swing angles. Therefore, the minimum one of the differences between the actual vehicle state quantity and the target vehicle state quantities calculated on the basis of the estimated steering angles is equal to the difference between the actual vehicle state quantity and the target vehicle state quantity calculated on the basis of the true steering angle.

According to the aforementioned first aspect, if a reference rotational position of the steering angle sensor has not been determined, a plurality of target vehicle state quantities are calculated on the basis of a plurality of steering angles estimated from a steering angle detected by the steering angle sensor, and motion of the vehicle is controlled on the basis of the minimum one of differences between an actual vehicle state quantity and target vehicle state quantities. Therefore, motion of the vehicle can be suitably controlled on the basis of a difference equal to the difference between the actual vehicle state quantity and the target vehicle state quantity calculated on the basis of a true steering angle.

As described above, the minimum one of the differences between an actual vehicle state quantity and a plurality of target vehicle state quantities calculated on the basis of a plurality of estimated steering angles is equal to a difference between the actual vehicle state quantity and the target vehicle state quantity calculated on the basis of a true steering angle. Therefore, a reference rotational position of the steering angle sensor can be determined as a steeling angle detection reference position such as a neutral position. On the basis of a steering angle corresponding to the minimum one of the differences between the actual vehicle state quantity and the target vehicle state quantities even unless the vehicle is traveling straight on at a constant speed, and a true steering angle can be calculated on the basis of the reference rotational position thus determined and the steering angle detected by the steering angle sensor.

According to the aforementioned second aspect, a plurality of target vehicle state quantities are calculated on the basis of a plurality of steering angles estimated from a steering angle detected by the steering angle sensor, a reference rotational position of the steering angle sensor is determined on the basis of a steering angle corresponding to the minimum one of the differences between an actual vehicle state quantity and the target vehicle state quantities, and a steering angle for controlling motion of the vehicle is then calculated on the basis of the reference rotational position thus determined and the steering angle detected by the steering angle sensor. Therefore, a steering angle can be precisely detected by means of the steering angle sensor and motion of the vehicle can be suitably controlled without requiring any means for storing a steering angle even when an ignition switch is off and even unless the vehicle is traveling straight on at a constant speed.

Furthermore, in the aforementioned second aspect, time averages of differences between an actual vehicle state quantity and target vehicle state quantities are calculated, and a reference rotational position of the steering angle sensor is determined on the basis of a steering angle corresponding to the minimum one of the time averages Therefore, in comparison with a case where a reference rotational position of the steering angle sensor is determined on the basis of a steering angle corresponding to the minimum one of differences between an actual vehicle state quantity and target vehicle state quantities, a reference rotational position of the steering angle sensor can be determined with the influence of traveling situations of the vehicle and the like being reduced more substantially.

A vehicular motion control method in accordance with a third aspect of the invention comprises the steps of detecting an absolute rotational angle of a steering operator operated by a driver, detecting all actual vehicle state quantity, calculating a plurality of target vehicle state quantities on the basis of a plurality of steering angles estimated from a detected steering angle if a reference rotational position of the steering angle sensor has not been determined, controlling motion of the vehicle on the basis of the minimum one of differences between the target state quantities and the actual vehicle state quantity.

A vehicular motion control method in accordance with a fourth aspect of the invention comprises the steps of detecting an absolute rotational angle of a steering operator operated by a driver by means of a steering angle sensor, detecting an actual vehicle state quantity, calculating a plurality of target vehicle state quantities on the basis of a plurality of steering angles estimated from a detected steering angle, determining a reference rotational position of the sting angle sensor on the basis of a steering angle corresponding to the minimum one of differences between an actual vehicle state quantity and the target vehicle state quantities, and then calculating a steering angle for controlling motion of the vehicle on the basis of the detected steering angle and the determined reference rotational position.

DETAILED DESCRIPTION OF THE PREFERRED EMBODIMENTS

Some preferred embodiments (hereinafter referred to simply as embodiments) of the invention will be described in detail with reference to the accompanying drawings.

Figure 1:
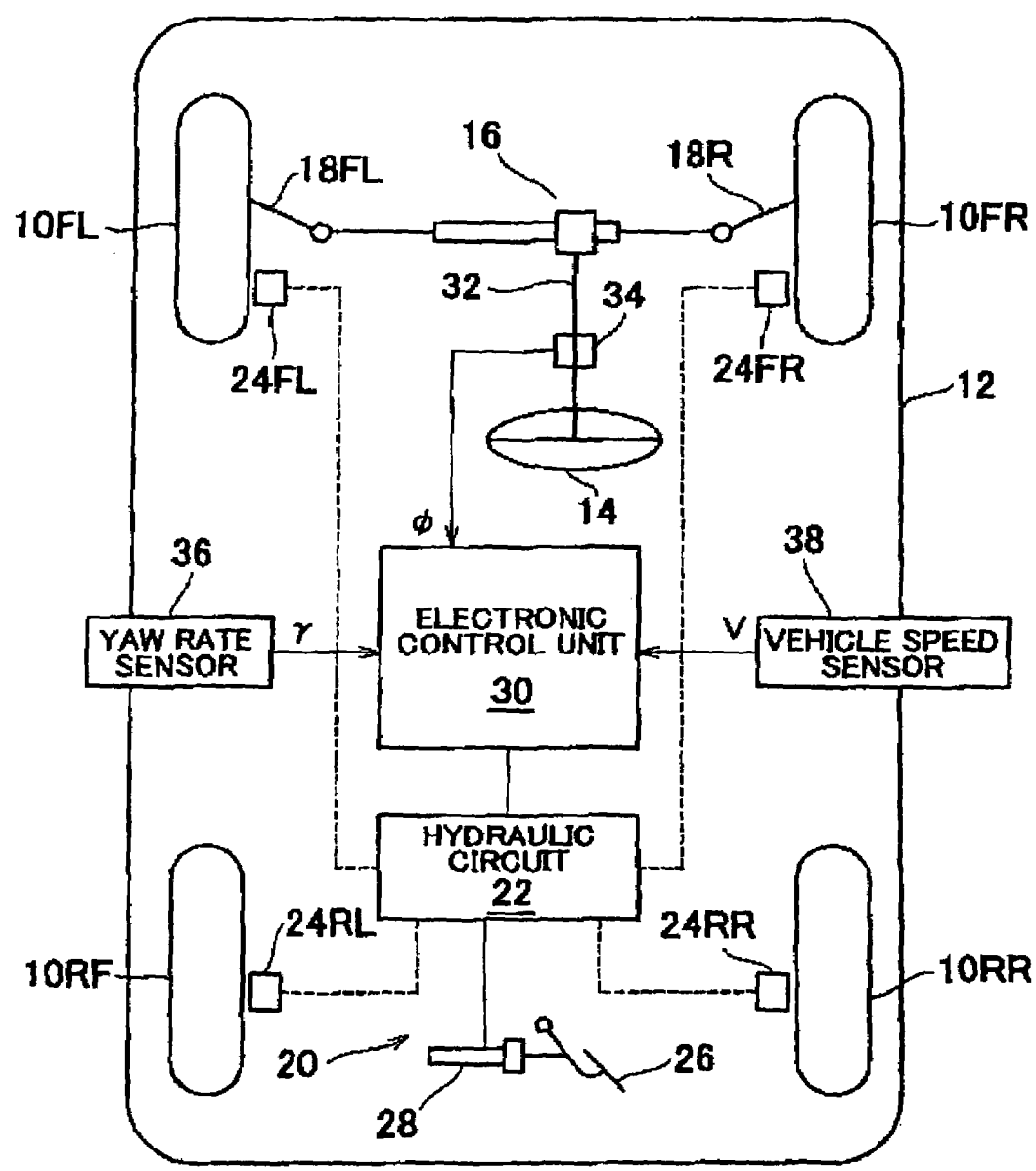
FIG. 1 is a schematic block diagram showing a vehicular motion control apparatus in accordance with a first preferred embodiment of the invention.

FIG. 1 is a schematic block diagram showing a vehicular motion control apparatus in accordance with the first preferred embodiment of the invention.

Referring to FIG. 1, reference symbols 10FL and 10FR denote front-left and front-right wheels of a vehicle 12 respectively, while reference symbols 10RL and 10RR denote rear-left and rear-right wheels of the vehicle 12 respectively. The rear-left and rear-right wheels 10RL and 10RR are driving wheels of the vehicle 12. The front-left and front-right wheels 10FL and 10FR, which are driven wheels and wheels to be steered, are steered by a rack-and-pinion power steering unit 16 via tie rods 18L and 18R respectively. The rack-and-pinion power steering unit 16 is driven in response to the turning of a steering wheel 14 by a driver.

A hydraulic circuit 22 of a brake unit 20 controls braking pressure applied to wheel cylinders 24FR, 24FL, 24RR and 24RL, whereby braking forces applied to the respective wheels are controlled. Although not shown in FIG. 1, the hydraulic circuit 22 includes a reservoir, an oil pump, various valve gears, and the like. Braking pressures applied to the wheel cylinders are usually controlled by a master cylinder 28 that is driven in accordance with the drivers operation of depressing a brake pedal 26. If necessary, braking pressures applied to the wheel cylinders are controlled by an electronic control unit 30, as will be described later in detail.

A steering column is provided with a steering angle sensor 34 that detects a rotational angle of a steering shaft 32 as a steering angle ϕ. The vehicle 12 is provided with a yaw rate sensor 36 that detects a yaw rate γ of the vehicle and with a vehicle speed sensor 38 that detects a vehicle; speed V. The steering angle sensor 34 and the yaw rate sensor 36 detect a steering angle and a yaw rate respectively on the assumption that they assume positive values when the vehicle makes a right turn.

Figure 5A:
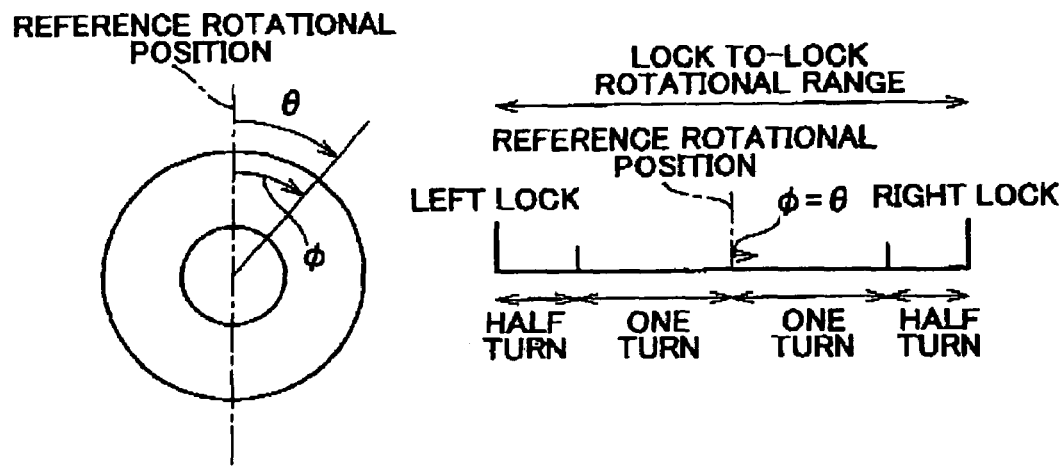
FIGS. 5A, 5B and 5C are explanatory views showing relationships between true steering angle $\theta$ and steering angle $\phi$ detected by a steering angle sensor.
Figure 5B:
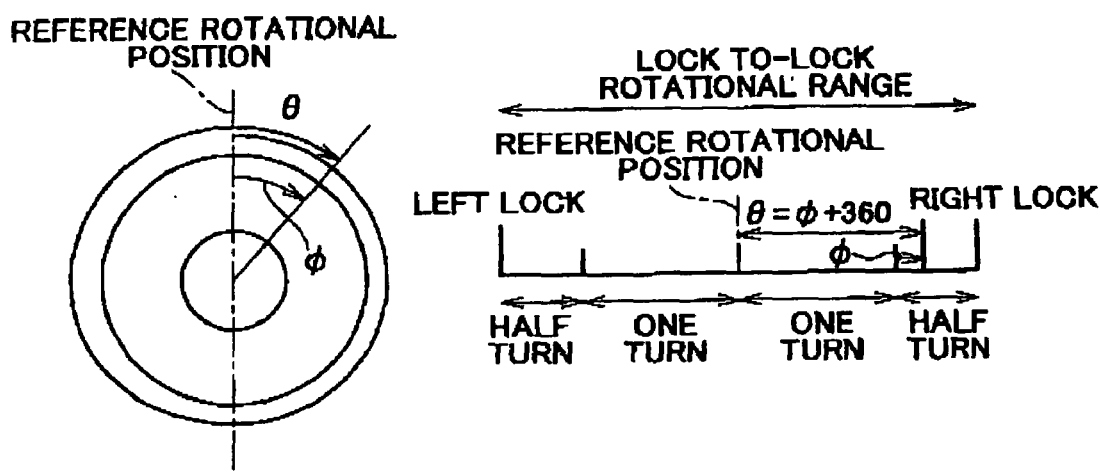
Figure 5C:
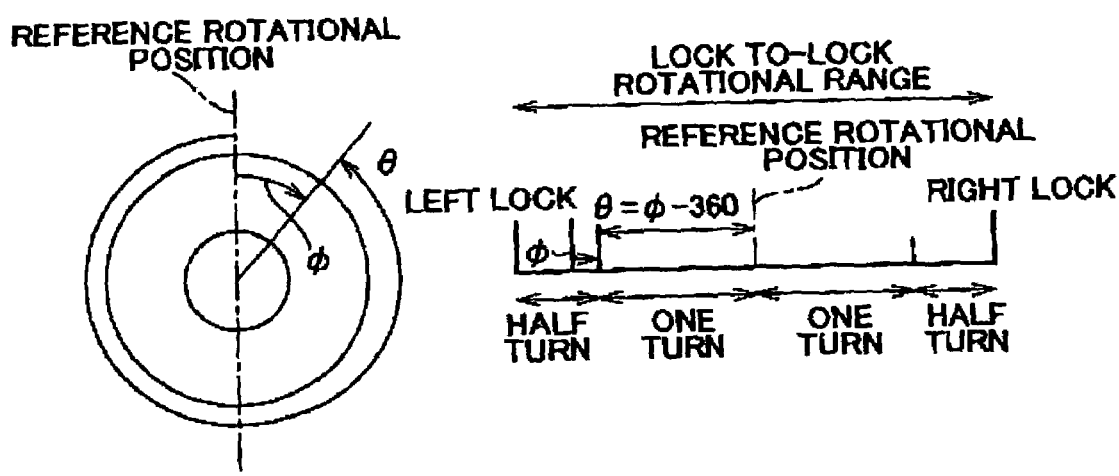

Especially in the illustrated embodiment, the lock-to-lock number of revolutions of a steering system of the power steering unit 16 is set as 3. The steering angle sensor 34 detects a steering angle ϕ as an absolute rotational angle of the steering shaft 32 with respect to a reference rotational position. Thus, as shown in FIGS. 5A, 5B and 5C, if determination of a reference rotational position has not been completed, the true steeling angle θ may be ϕ, ϕ+360° or ϕ−360°. By determining the reference rotational position as a neutral position corresponding to a straight traveling state of the vehicle, the true steering angle θ is specified as one of the aforementioned three angles.

As shown in FIG. 1, a signal indicative of a steering angle ϕ detected by the steering angle sensor 34, a signal indicative of a yaw rate γ detected by the yaw rate sensor 36, and a signal indicative of a vehicle speed V detected by the vehicle speed sensor 38 are input to the electronic control unit 30. Although not shown in detail in FIG. 1, the electronic control unit 30 includes, for example, a microcomputer having a general construction wherein a CPU, a ROM, a RAM, and an input/output unit are interconnected by a bidirectional common bus.

Figure 2:
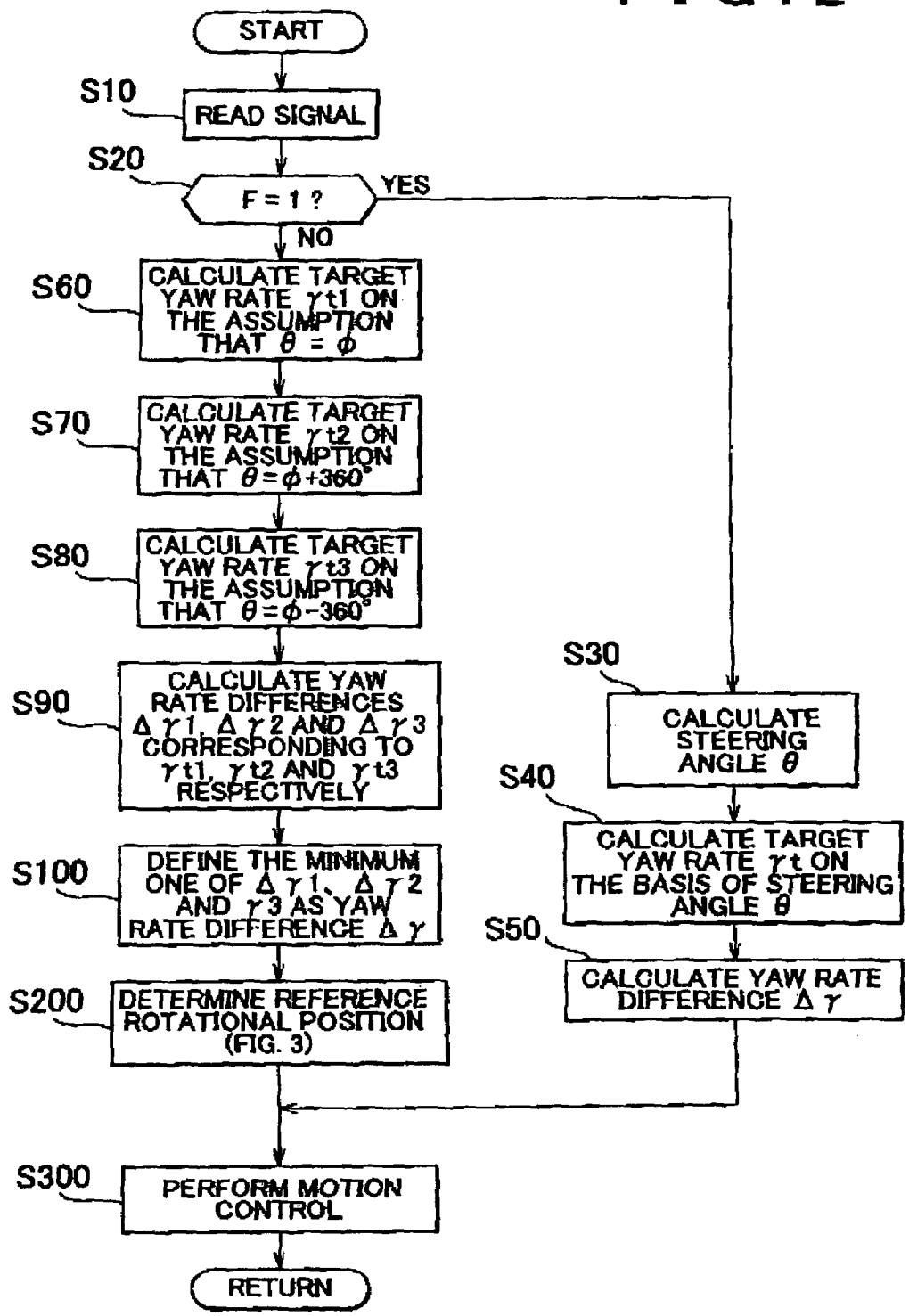
FIG. 2 is a flowchart showing a motion control routine of the first embodiment.

As will be described later, according to the flowcharts shown in FIGS. 2 and 3, if a reference rotational position of the steering angle sensor 34 has been determined, the electronic control unit 30 calculates a steering angle θ on the basis of the deterred reference position and a steering angle ϕ detected by the steering angle sensor 34, and calculates a target yaw rate Δt of the vehicle on the basis of the steering angle θ. On the basis of a difference Δγ between the target yaw rate γt and the yaw rate γ detected by the yaw rate sensor 36, the braking unit 20 controls braking forces applied to the wheels and thereby controls motion of the vehicle.

On the other hand, if the reference rotational position of the steering angle sensor 34 has not been determined, the electronic control unit 30 provisionally calculates three target yaw rates γt1, γt2 and γt3 on the assumption that the steering angle θ is equal to ϕ, ϕ+360° and ϕ−360°, respectively. The electronic control unit 30 then calculates a difference Δγ1 between the target yaw rate γt1 and the yaw rate γ detected by the yaw rate sensor 36, a difference Δγ2 between the target yaw rate γt2 and the yaw rate γ detected by the yaw rate sensor 36, and a difference Δγ3 between the target yaw rate γt3 and the yaw rate γ detected by the yaw rate sensor 36. The braking unit 20 controls braking forces applied to the wheels on the basis of die minimum one of the differences Δγ1, Δγ2 and Δγ3, and thereby controls motion of the vehicle.

The electronic control unit 30 calculates time averages Δγa1, Δγa2 and Δγa3 of absolute values of the differences Δγ1, Δγ2 and Δγ3, determines a reference rotational position of a steering angle ϕ corresponding to the minimum one of the time averages Δγa1, Δγa2 and Δγa3 as a neutral position, and then calculates a steering angle θ for motion control of the vehicle on the basis of the reference rotational position thus determined and a steering angle ϕ detected by the steering angle sensor 34.

Next, a motion control routine of the first embodiment will be described with reference to the flowcharts shown in FIGS. 2 and 3. A control operation based on the flowchart shown in FIG. 2 is started by closing an ignition switch (not shown) and is repeated at intervals of a predetermined period. At the beginning of the control operation, a flag F indicating whether or not determination of a reference rotational position of the steering angle sensor 34 has been completed is initialized by being reset as 0.

First of all in a step 10, a signal or the like indicative of a steering angle ϕ detected by the steering angle sensor 34 is read In a step 20, it is determined whether or not the flag F indicates 1, namely, whether or not determination of a reference rotational position of the steering angle sensor 34 has been completed. If the result in the step 20 is negative, the control operation proceeds to a step 60. If the result in the step 20 is positive, the control operation proceeds to a step 30.

In the step 30, a steering angle θ for controlling motion of the vehicle is calculated on the basis of a reference rotational position determined in the later described step 200 and a steering angle ϕ detected by the steering angle sensor 34.

In a step 40, a reference yaw rate γe is calculated according to an equation (1) shown below wherein N, H and Kh represent a steering gear ratio, a wheel base, and a stability factor respectively. A target yaw rate γt of the vehicle is calculated according to an equation (2) shown below wherein T and "s" represent a time constant and an Laplace operator respectively. A reference yaw rate γe may be calculated in consideration of a lateral acceleration Gy of the vehicle so as to take a dynamic yaw rate into account.

$$\gamma e = V\phi/(1+KhV^2)NH \quad (1)$$

$$\gamma e = V\phi/(1+Ts) \quad (2)$$

In a step 50, a yaw rate difference Δγ is calculated as a difference between the target yaw rate γt and a yaw rate γ detected by the yaw rate sensor 36. The control operation then proceeds to a step 300.

In a step 60, the steering angle is set as a steering angle ϕ detected by the steering angle sensor 34, and a target yaw rate γt1) of the vehicle is calculated according to the aforementioned equations (1) and (2). In a step 70, the steering angle θ is set as ϕ+360°, and a target yaw rate γt2 of the vehicle is calculated according to the aforementioned equations (1) and (2). In a step 80, the steering angle θ is set as ϕ−360°, and a target yaw rate γt3 of the vehicle is calculated according to the aforementioned equations (1) and (2).

In a step 90, yaw rate differences Δγ1, Δγ2 and Δγ3 corresponding to the target yaw rates γ1, γ2 and γ3 respectively are calculated as differences between the yaw rate γ detected by the yaw rate sensor 36 and the target yaw rates γt1, γt2 and γt3 respectively. In a step 100, the minimum one of the yaw rate differences Δγ1, Δγ2 and Δγ3 is set as the yaw rate difference Δγ.

Figure 3:
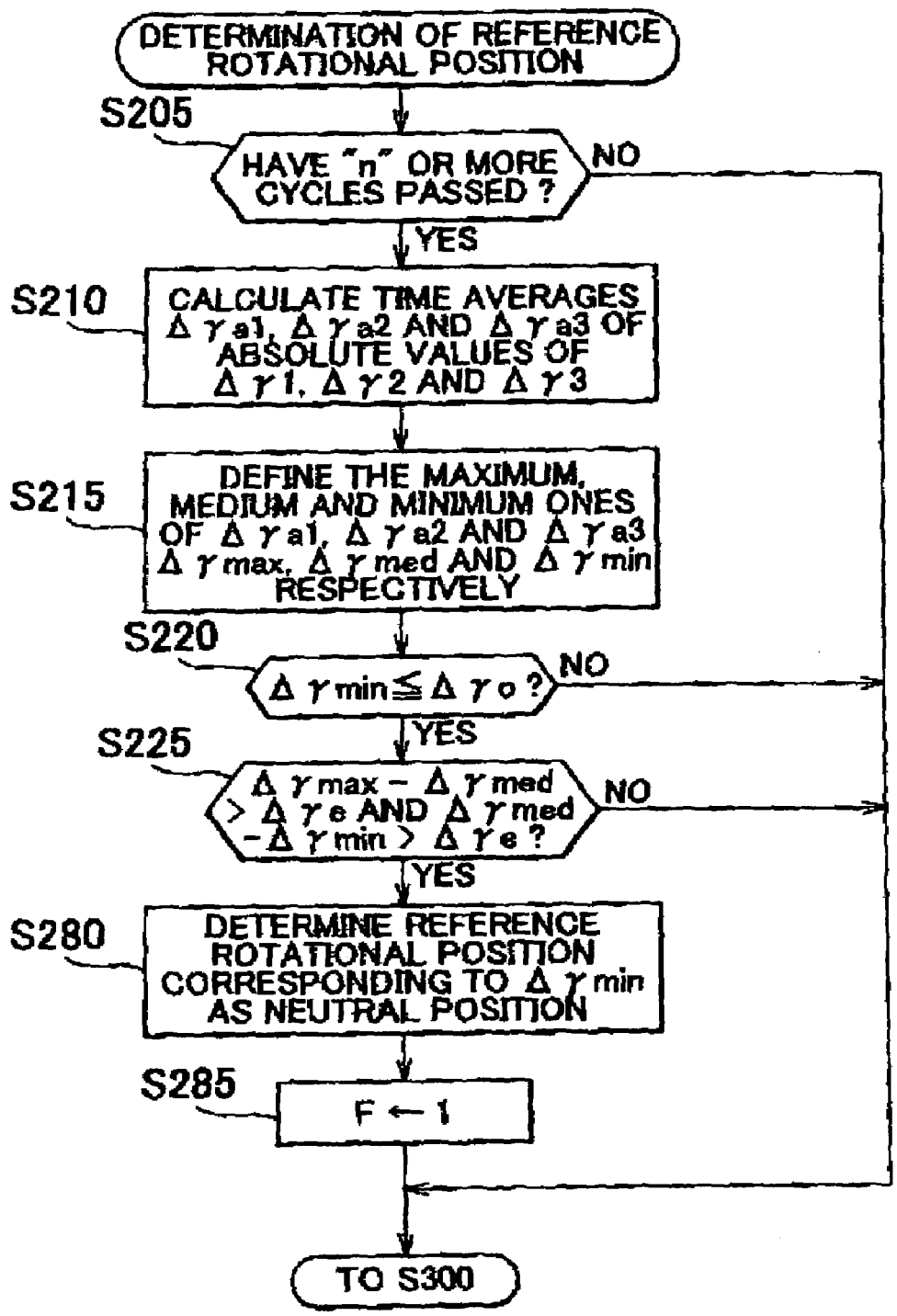
FIG. 3 is a flowchart showing a reference rotational position determining routine in a step 200 of the flowchart shown in FIG. 2.

In the step 200, a reference rotational position of the steering angle sensor 34 is determined according to the routine shown in FIG. 3. In the step 300, according to the gist known in the technical field of the invention, braking forces applied to the wheels are controlled on the basis of the yaw rate difference Δγ such that the yaw rate difference Δγ decreases. Thereby, motion control of the vehicle is performed so as to ensure running stability thereof.

Next, a routine that is executed in the step 200 to determine a reference rotational position of the steering angle sensor 34 will be described with reference to FIG. 3.

First of all in a step 205, it is determined whether or not "n" (a positive, constant integer) cycles have passed since the start of the control operation. If the result in the step 205 is negative, the control operation proceeds to the step 300 immediately. If the result in the step 205 is positive, the control operation proceeds to a step 210.

In the step 210, time averages $\Delta\gamma a1$, $\Delta\gamma a2$ and $\Delta\gamma a3$ of absolute values of the yaw rate differences $\Delta\gamma 1$, $\Delta\gamma 2$ and $\Delta\gamma 3$ in the first to the latest "n" cycles are calculated. In a step 215, the maximum, medium and minimum ones of the time averages $\Delta\gamma a1$, $\Delta\gamma a2$ and $\Delta\gamma a3$ are defined as $\Delta\gamma max$, $\Delta\gamma med$ and $\Delta\gamma min$ respectively.

In a step 220, a reference value $\Delta\gamma_0$ is calculated according to an equation (3) shown below wherein $\Delta\gamma b$ and $\Delta\gamma c$ are positive constants. In the step 220, it is determined whether or not the minimum time average $\Delta\gamma min_5$ is equal to or smaller than the reference value $\Delta\gamma_0$, namely, whether or not the behavior of the vehicle is relatively stable. If the result in the step 220 is negative, the control operation proceeds to the step 300 immediately. If the result in the step 220 is positive, the control operation proceeds to a step 225.

$$\Delta\gamma_0 = \Delta\gamma b \times V + \Delta\gamma c \qquad (3)$$

In the step 225, it is determined whether or not a difference between the maximum time average $\Delta\gamma max$ and the medium time average $\Delta\gamma med$ is larger than a reference value $\Delta\gamma e$ (a positive constant) while a difference between the medium time average $\Delta\gamma med$ and the minimum time average $\Delta\gamma min$ is larger than the reference value $\Delta\gamma e$. If the result in the step 225 is negative, the control operation proceeds to the step 300. If the result in the step 225 is positive, the control operation proceeds to a step 280. The determination in the step 225 is made to exclude a situation in which a relationship in magnitude among three Steering angles estimate from the detected steering angle $\phi$ does not correspond to a relationship in magnitude among the time averages $\Delta\gamma a1$, $\Delta\gamma a2$ and $\Delta\gamma a3$ as a result of calculation of time averages of absolute values of yaw rate differences.

In the step 280, a reference rotational position of the steering angle $\phi$ used for calculation of the yaw rate differences $\Delta\gamma a1$ to $\Delta\gamma a3$ corresponding to the minimum time average $\Delta\gamma min$ is determined as a neutral position. In a step 285, the flag F1 is set as 1. The control operation then proceeds to the step 300.

Thus, according to the first embodiment illustrated in the drawings, if determination of a reference rotational position of the steering angle sensor 34 has not been completed, the result in the step 20 is negative. Then in the steps 60 to 80, three target yaw rates $\gamma t1$, $\gamma t2$ and $\gamma t3$ of the vehicle are provisionally calculated on the assumptions that the steering angle $\theta$ is $\phi$, $\phi+360°$ and $\phi-360°$ respectively. The true steering angle $\theta$ may be $\phi$, $\phi+360°$ or $\phi-360°$. In the step 90, differences between a yaw rate $\gamma$ detected by the yaw rate sensor 36 and the target yaw rates $\gamma t1$, $\gamma t2$ and $\gamma t3$ are calculated. In the step 100, the minimum ozie of the differences $\Delta\gamma 1$, $\Delta\gamma 2$ and $\Delta\gamma 3$ is defined as the yaw rate difference $\Delta\gamma$. In the step 300, braking forces applied to the wheels are controlled on the basis of the yaw rate difference $\gamma\gamma$ such that the yaw rate difference $\Delta\gamma$ decreases, whereby motion of the vehicle is controlled.

Accordingly, even if the behavior of the vehicle has deteriorated in a situation where determination of a reference rotational position of the steering angle sensor 34 has Dot been completed, motion of the vehicle can be controlled on the basis of the minimum one of the yaw rate differences $\Delta\gamma 1$, $\Delta\gamma 2$ and $\Delta\gamma 3$, namely, a yaw rate difference that is most likely to correspond to a true steeling angle. Thus, the behavior of the vehicle can be stabilized reliably.

Immediately a takeoff of the vehicle, determination of a reference rotational position of the steering angle sensor 34 has not been completed. In this situation, a substantial determination of the behavior of the vehicle is seldom caused. The magnitude of the minimum one of the yaw rate differences $\Delta\gamma 1$, $\Delta\gamma 2$ and $\Delta\gamma 3$ is small. Therefore, even in the case where the minimum one of the yaw rate differences $\Delta\gamma 1$, $\Delta\gamma 2$ and $\Delta\gamma 3$ does not correspond to a true steering angle, motion control of the vehicle based on the minimum one of the differences does not cause excessive inconvenience to the traveling of the vehicle.

According to the first embodiment illustrated in the drawings, if determination of a reference rotational position of the steering angle sensor 34 has not been completed, time averages $4\Delta\gamma a1$, $\Delta\gamma a2$ and $\Delta\gamma a3$ of absolute values of the yaw rate differences $\Delta\gamma 1$, $\Delta\gamma 2$ and $\Delta\gamma 3$ are calculated in the step 210 of the reference rotational position determining routine starting from the step 200. In the steps 215 to 280, the reference rotational position of a steering angle $\phi$ corresponding to the minimum one of the time averages $\Delta\gamma a1$, $\Delta\gamma a2$ and $\Delta\gamma a3$ is determined as a neutral position. Thereafter, a steering angle $\theta$ for controlling motion of the vehicle is calculated on the basis of the reference rotational position thus determined and the steering angle $\phi$ detected by the steering angle sensor 34. Therefore, there is no need to provide any means for storing a steering angle even while the ignition switch is off. A reference rotational position of the steering angle sensor 34 can be determined as a neutral position for steering even unless the vehicle is traveling straight on at a constant speed.

Especially according to the embodiment illustrated in the drawings, time averages $\Delta\gamma a1$, $\Delta\gamma a2$ and $\Delta\gamma a3$ of absolute values of the yaw rate differences $\Delta\gamma 1$, $\Delta\gamma 2$ and $\Delta\gamma 3$ in the first to the latest "n" cycles are calculated in the step 210. In the steps 215 to 280, the reference rotational position of a steering angle $\phi$ corresponding to the minimum one of the time averages $\Delta\gamma a1$, $\gamma a2$ and $\gamma a3$ is determined as a neutral position. Therefore, in comparison with a case where the reference rotational position of a steering angle $\phi$ corresponding to the minimum one of the yaw rate differences $\Delta\gamma 1$, $\Delta\gamma 2$ and $\Delta\gamma 3$ instead of the minimum one of the time averages $\Delta\gamma a1$, $\Delta\gamma a2$ and $\Delta\gamma a3$ is determined as a neutral position, it is possible to determine a reference rotational position of the steering angle sensor 34 more precisely.

In the embodiment illustrated in the drawings, the maximum, medium and minimum ones of the time averages $\Delta\gamma a1$, by $\Delta\gamma 2$ and $\Delta\gamma 3$ are defined as $\Delta\gamma max$, $\Delta\gamma med$ and $\Delta\gamma min$ respectively in the step 215. If it is determined in the step 220 that the minimum one $\Delta\gamma min$ of the time averages is equal to or smaller than the reference value $\Delta\gamma_0$ and if it is determined in the step 225 that a difference between the maximum one $\Delta\gamma max$ of the time averages and the medium one $\Delta\gamma med$ of the time averages is larger than the reference value $\Delta\gamma e$ while a difference between the medium one $\Delta\gamma med$ of the time averages and the minimum one $\Delta\gamma min$ of the time averages is larger than the reference value $\Delta\gamma e$, the reference rotational position of a steering angle $\phi$ used for calculation of a yaw rate difference corresponding to the minimum one $\Delta\gamma min$ of the time averages is determined as a neutral position in the step 280. Therefore, in comparison with a case where the determination in the step 220 or the step 225 is not made, the possibility of determining a reference rotational position of the steering angle sensor 34 imprecisely as a result of the influence of the behavior of the vehicle or calculation of the time averages of the absolute values of the yaw rate differences can be reduced reliably.

According to the embodiment illustrated in the drawings, the reference value $\Delta\gamma_0$ in the determination of the step 220 is calculated according to the aforementioned equation (3) while the vehicle speed V is taken into account. Therefore, in comparison with a case where the reference value $\Delta\gamma_0$ is set as a constant without taking the vehicle speed V into account, the reference value $\Delta\gamma_0$ can be set more suitably in accordance with a vehicle speed. As a result, a reference rotational position of the steering angle sensor 34 can be determined while suitably excluding the influence of the behavior of the vehicle.

Figure 4:
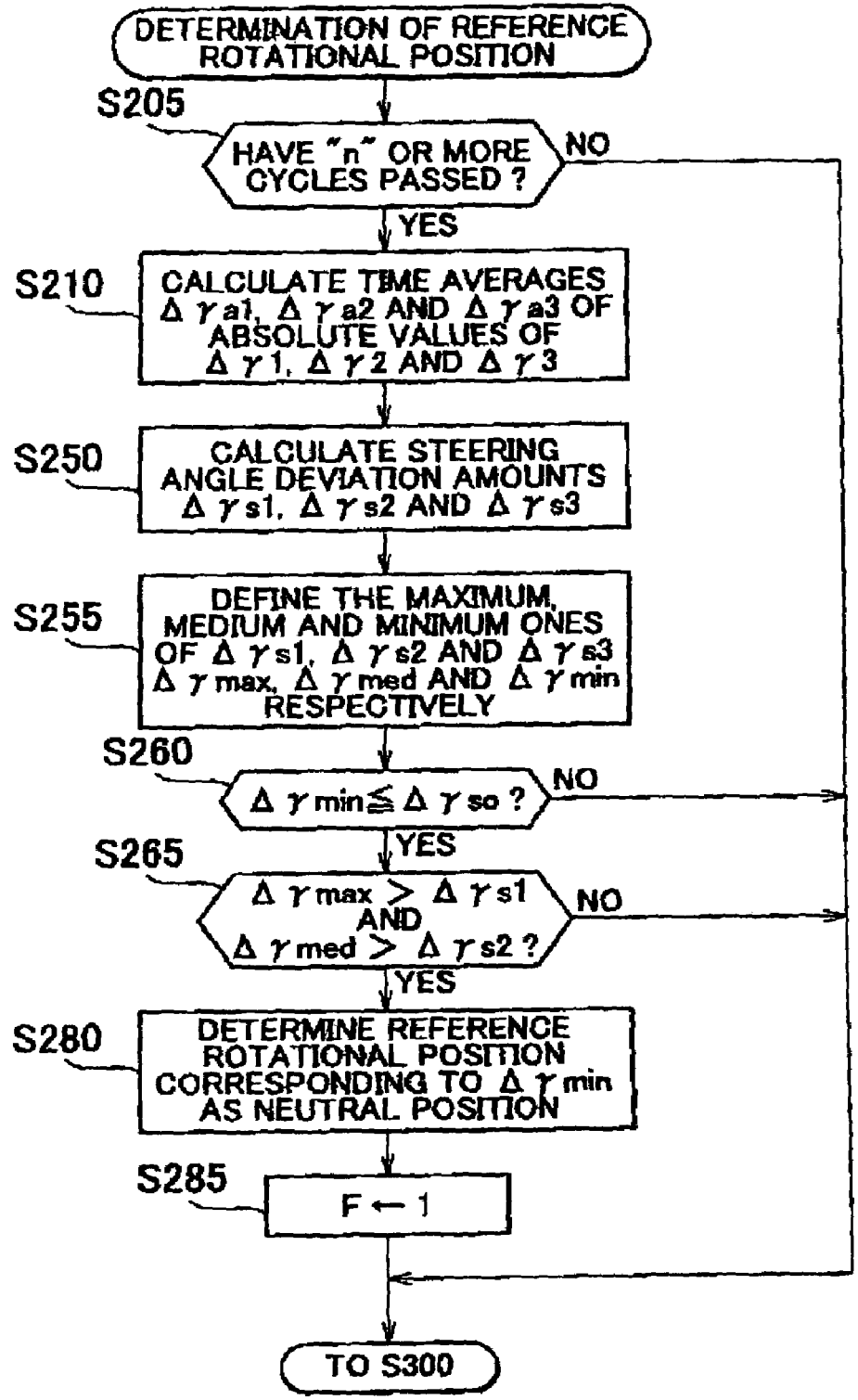
FIG. 4 is a flowchart showing a reference rotational position determining routine in a vehicular motion control apparatus in accordance with a second preferred embodiment of the invention.

FIG. 4 is a flowchart showing a reference rotational position determining routine in a vehicular motion control apparatus in accordance with the second preferred embodiment of the invention. Referring to FIG. 4, steps identical with those in FIG. 3 are accompanied by the same step numbers.

In the second embodiment, although not shown in FIG. 4, processings in the steps 10 to 100 and the step 300 of the vehicular motion control routine are performed substantially in the same manner as in the aforementioned first embodiment. Further, as shown in FIG. 3, processings in the steps 205, 210, 280 and 285 of the reference rotational position determining routine starting from the step 200 are also performed substantially in the same manner as in the aforementioned first embodiment.

In a step 250 subsequent to the step 210, steering angle deviation amounts $\Delta\gamma s1$, $\Delta\gamma s2$ and $\Delta\gamma s3$ are calculated on the basis of the averages $\Delta\gamma a1$, $\Delta\gamma a2$ and $\Delta\gamma a3$ respectively, according to equations (4) to (6) shown below. In a step 255, the maximum, medium and minimum ones of the steering angle deviation amounts $\Delta\gamma s1$, $\Delta\gamma s2$ and $\Delta\gamma s3$ are defined as $\Delta\gamma\max$, $\Delta\gamma\text{med}$ and $\Delta\gamma\min$ respectively.

$$\Delta\gamma s1 = \Delta\gamma a1 \times (NH/V) \qquad (4)$$

$$\Delta\gamma s2 = \Delta\gamma b2 \times (NH/V) \qquad (5)$$

$$\Delta\gamma s3 = \Delta\gamma c3 \times (NH/V) \qquad (6)$$

In a step 260, it is determined whether or not the minimum one of the steering angle deviation amounts is equal to or smaller than a reference value $\Delta\gamma s_0$ (a positive constant), namely, whether or not the vehicle is in a relatively stable traveling state. If the result in the step 260 is negative, the control operation proceeds to the step 300. If the result in the step 260 is positive, the control operation proceeds to a step 265. As is the case with the reference value $\Delta\gamma_0$ of the aforementioned first embodiment, the reference value $\Delta\gamma s_0$ may also be calculated as a function of the vehicle speed V.

In the step 265, it is determined whether or not the maximum one $\Delta\gamma\max$ of the steering angle deviation amounts is larger than a reference value $\Delta\gamma s1$ (a positive constant) while the medium one $\Delta\gamma\text{med}$ of the steering angle deviation amounts is larger than a reference value $\Delta\gamma s2$ (a positive constant smaller than $\Delta\gamma s1$). If the result in the step 265 is negative, the control operation proceeds to the step 300 immediately. If the result in the step 265 is positive, the processings in the steps. 280 and 285 are performed substantially in die same manner as in the aforementioned first embodiment.

As is the case with the step 225 of the aforementioned fist embodiment, the determination in the step 265 is made to exclude a situation in which a relationship in magnitude among three steering angles estimated from the detected steering angle ϕ does not correspond to a relationship in magnitude among the steering angle deviation amounts $\Delta\gamma s1$, $\Delta\gamma s2$ and $\Delta\gamma s3$ as a result of calculation of time averages of absolute values of yaw rate differences.

Thus, the second embodiment illustrated in FIG. 4 can substantially achieve the same operation and effect as the aforementioned first embodiment. In particular, according to the second embodiment, the steering angle deviation amounts $\Delta\gamma s1$, $\Delta\gamma s2$ aid $\Delta\gamma s3$ are calculated on the basis of the time averages $\Delta\gamma a1$, $\Delta\gamma a2$ and $\Delta\gamma a3$ respectively in the step 250. In the step 255, the maximum, medium and minimum ones of the steering angle deviation amounts $\Delta\gamma s1$, $\Delta\gamma s2$ and $\Delta\gamma s3$ are defined as $\Delta\gamma\max$, $\Delta\gamma\text{med}$ and $\Delta\gamma\min$ respectively. As for these values, the determinations in the steps 260 and 265 are made. Therefore, in comparison with a case where the determination in the step 260 or 265 is not made, the reference rotational position of the steering angle sensor 34 can be determined more precisely.

The specific embodiments of the invention have been described hitherto in detail. However, it would be obvious to those skilled in the art that the invention is not limited to the aforementioned embodiments, and that more varieties of embodiments are possible within the scope of the invention.

For example, the vehicle state quantity represents yaw rate in the aforementioned embodiments. However, the vehicle state quantity may be any vehicle state quantity associated with steering angle, for example, lateral acceleration Gy of the vehicle or wheel speed difference $\Delta V_w$ between the font-left and front-right wheels. A target lateral acceleration Gyt of the vehicle may be calculated according to an equation (7) shown below. A target wheel spend difference $\Delta$Vwt between the front-left and front-light wheels may be calculated as a tread Tf according to an equation (8) shown below.

$$Gyt = \gamma tV \qquad (7)$$

$$\Delta Vwt = \gamma tTf \qquad (8)$$

In the aforementioned embodiments, if determination of a reference rotational position of the steering angle sensor 34 has been completed, the steering angle θ for controlling motion of the vehicle is calculated on the basis of the determined reference rotational position and the steering angle ϕ detected by the steering angle sensor 34 in the step 30. The target yaw rate γt of the vehicle is calculated in the step 40, and the yaw rate difference Δγ is calculated in the step 50. In the step 300, motion of the vehicle is controlled on the basis of the yaw rate difference Δγ. However, motion control, which is performed if determination of a reference rotational position of the steering angle sensor 34 has been completed, is not limited to a control operation based on the yaw rate difference by. As long as the steering angle θ for motion control which is calculated on the basis of the determined reference rotational position and the steering angle ϕ detected by the steering angle sensor 34 is used, motion control may be any vehicle control operation that is known in the technical field of the invention In the aforementioned respective embodiments, the lock-to-lock number of revolutions of the steering system is 3. However, the lock-to-lock number of revolutions may be a value other than 3. The steering angle sensor 34 may have such a resolution that the reference rotational position thereof rotates by a rotational angle larger than 360° per one turn of the steering shaft. In this case, a target vehicle state quantity such as a target yaw rate is calculated the same number of times as the reference rotational position of the steering angle sensor 34 rotates by 360° within a lock-to-lock rotational range of the steering shaft.

For instance, if the lock-to-lock number of revolutions is 3 while the steering angle sensor 34 is twice as high in resolution as in the embodiments illustrated in the drawings, the true steering angle θ may be φ, φ+180°, φ+360°, φ−180° or 360°. Therefore, a target vehicle state quantity is calculated as to each of the steering angles φ, φ+180°, φ+360°, φ−180° and φ−360°.

What is claimed is:

1. A vehicular motion control apparatus, comprising:
a steering operator that is operated by a driver;
a steering angle sensor that detects a steering angle as an absolute rotational angle of the steering operator;
a detector that detects an actual vehicle state quantity; and
a controller that calculates a plurality of target vehicle state quantities on the basis of a plurality of steering angles estimated from the steering angle detected by the steering angle sensor if a reference rotational position of the steering angle sensor has not been determined, and that controls motion of a vehicle on the basis of a minimum difference between the actual vehicle state quantity and the target vehicle state quantities;
wherein the number of the target vehicle state quantities that are calculated is equal to the number of 360° turns of the reference rotational position of the steering angle sensor within a rotatable angle range of the steering operator.

2. The control apparatus according to claim 1, wherein the vehicle state quantity is estimated on the basis of a steering angle.

3. The control apparatus according to claim 2, wherein the vehicle state quantity is a yaw rate of the vehicle, a lateral acceleration of the vehicle, or a wheel speed difference between left and right wheels to be steered.

4. A vehicular motion control apparatus, comprising:
a steering operator that is operated by a driver;
a steering angle sensor that detects a steering angle as an absolute rotational angle of the steering operator;
a detector that detects an actual vehicle state quantity; and
a controller that calculates a plurality of target vehicle state quantities on the basis of a plurality of steering angles estimated from the steering angle detected by the steering angle sensor, that determines a reference rotational position of the steering angle sensor on the basis of a steering angle corresponding to a minimum difference between the actual vehicle state quantity and the target vehicle state quantities, and that then calculates a steering angle for controlling motion of a vehicle on the basis of the steering angle detected by the steering angle sensor and the determined reference rotational position;
wherein the number of the target vehicle state quantities that are calculated is equal to the number of 360° turns of the reference rotational position of the steering angle sensor within a rotatable angle range of the steering operator.

5. The control apparatus according to claim 4, wherein the controller calculates a target control amount using the steering angle for controlling motion of the vehicle, and controls motion of the vehicle on the basis of the target control amount.

6. The control apparatus according to claim 4, wherein the controller calculates an average of the difference between the actual vehicle state quantity and each target vehicle state quantity over a time period of n cycles, and determines the reference rotational position of the steering angle sensor on the basis of a steering angle corresponding to a minimum one of the averages.

7. The control apparatus according to claim 6, wherein the controller determines the reference rotational position of the steering angle sensor on the basis of the steering angle corresponding to the minimum one of the averages if the minimum one of the averages is equal to or smaller than a reference value.

8. The control apparatus according to claim 7, wherein the controller determines the reference rotational position of the steering angle sensor on the basis of a steering angle corresponding to a minimum one of the averages if the minimum one of the averages is equal to or smaller than a reference value while a difference between a maximum one of the averages and a medium one of the averages is larger than a predetermined value and a difference between the medium one of the averages and the minimum one of the averages is larger than the predetermined value.

9. The control apparatus according to claim 4, wherein the controller calculates an average of the difference between the actual vehicle state quantity and each target vehicle state quantity over a time period of n cycles, calculates steering angle deviation amounts on the basis of the averages according to an equation shown below, and determines the reference rotational position of the steering angle sensor on the basis of a steering angle corresponding to the minimum one of the steering angle deviation amounts, and the equation is:

steering angle deviation amount=average of difference between actual vehicle state quantity and target vehicle state quantity over a time period of n cycles×($NH/V$)

where N, H, and V represent a ratio of a turning angle of the wheels to a total operation amount of the steering operator, a distance between the front wheels and the rear wheels, and a vehicle speed, respectively.

10. The control apparatus according to claim 4, wherein the vehicle state quantity is estimated on the basis of a steering angle.

11. The control apparatus according to claim 10, wherein the vehicle state quantity is a yaw rate of the vehicle, a lateral acceleration of the vehicle, or a wheel speed difference between left and right wheels to be steered.

12. A vehicular motion control method, comprising:
detecting a steering angle as an absolute rotational angle of a steering operator operated by a driver by means of a steering angle sensor;
detecting an actual vehicle state quantity;
calculating a plurality of target vehicle state quantities on the basis of a plurality of steering angles estimated from the detected steering angle;
determining a reference rotational position of the steering angle sensor on the basis of a steering angle corresponding to a minimum difference between the actual vehicle state quantity and the target vehicle state quantities; and
calculating a steering angle for controlling motion of the vehicle on the basis of the detected steering angle and the determined reference rotational position;
wherein a target vehicle state quantity is determined for each 360° rotational of the steering operator within a rotatable angle range of the steering operator.

13. The control method according to claim 12, further comprising
   calculating averages of the difference between the actual vehicle state quantity and each target vehicle state quantity,
   wherein
   the reference rotational position of the steering angle sensor is determined on the basis of the steering angle corresponding to a minimum one of the averages.

14. A vehicular motion control method, comprising:
   detecting a steering angle as an absolute rotational angle of a steering operator operated by a driver;
   detecting an actual vehicle state quantity;
   calculating a plurality of target vehicle state quantities on the basis of a plurality of steering angles estimated from the detected steering angle if a reference rotational position of the steering angle sensor has not been determined; and
   controlling motion of the vehicle on the basis of a minimum difference between the target vehicle state quantities and the actual vehicle state quantity;
   wherein a target vehicle state quantity is determined for each 360° rotational of the steering operator within a rotatable angle range of the steering operator.

* * * * *